United States Patent
Chieh

(10) Patent No.: US 7,084,912 B2
(45) Date of Patent: Aug. 1, 2006

(54) METHOD FOR REDUCING COHERENT ROW-WISE AND COLUMN-WISE FIXED PATTERN NOISE IN CMOS IMAGE SENSORS

(76) Inventor: Yuen-Shung Chieh, 3740 NW. Hayes Ave., Corvallis, OR (US) 97330

( * ) Notice: Subject to any disclaimer, the term of this patent is extended or adjusted under 35 U.S.C. 154(b) by 739 days.

(21) Appl. No.: 09/956,722

(22) Filed: Sep. 20, 2001

(65) Prior Publication Data

US 2003/0052982 A1    Mar. 20, 2003

(51) Int. Cl.
H04N 9/64 (2006.01)
H04N 3/14 (2006.01)

(52) U.S. Cl. ...................................... 348/245; 348/308

(58) Field of Classification Search ............... 348/241, 348/243, 245, 248, 302, 308; 250/208.1
See application file for complete search history.

(56) References Cited

U.S. PATENT DOCUMENTS 4,996,413 A * 2/1991 McDaniel et al. ....... 250/208.1
5,225,696 A * 7/1993 Bahraman .................... 257/291
5,654,755 A * 8/1997 Hosier ......................... 348/245
6,130,712 A * 10/2000 Miyazaki et al. ........... 348/243
6,369,853 B1 * 4/2002 Merrill et al. ............... 348/302
6,476,864 B1 * 11/2002 Borg et al. .................. 348/245
6,744,526 B1 * 6/2004 McDermott et al. ........ 358/1.11

FOREIGN PATENT DOCUMENTS

EP    357084 A1 *    3/1990

* cited by examiner

*Primary Examiner*—Ngoc-Yen Vu
*Assistant Examiner*—Timothy J. Henn

(57) ABSTRACT

A technique for the reduction of coherent row-wise and column-wise fixed-pattern noise in MOS image sensing systems. An array of reference pixels is associated with each row of imaging pixels. The output of each imaging pixel is coupled through a respective imaging column amplifier to a column multiplexer, thereby constituting an imaging pixel signal. In one embodiment, the output of each of a number of reference pixels is coupled to a respective reference column amplifier and from there to a reference multiplexer. The reference multiplexer effects a pseudorandom selection from the outputs of the reference column amplifiers to form a reference signal. The reference signal and the column output are differentially coupled to the remainder of the analog signal path. Synthesis of the reference signal as described above distributes row-wise and column-wise noise randomly, thereby mitigating the effects of coherent noise and enhancing image quality.

41 Claims, 4 Drawing Sheets

METHOD FOR REDUCING COHERENT ROW-WISE AND COLUMN-WISE FIXED PATTERN NOISE IN CMOS IMAGE SENSORS

BACKGROUND OF THE INVENTION

1. Field of the Invention

The invention relates to electronic imaging technology and, more particularly, to a technique that ameliorates the effects of row-wise and column-wise coherent noise in Active-Pixel Sensor (APS) imaging systems.

2. Description of the Related Art

Since the 1970s, charge-coupled devices (CCDs) have been used in the majority conventional imaging circuits, serving as a mechanism for converting a pixel of light energy into an electrical signal that represents the intensity of light energy. In general, CCDs utilize a photogate to convert light energy into an electrical charge. A series of electrodes transfer the charge collected at the photogate to an output sense node.

Although CCDs have many strengths, including a high sensitivity and fill factor, CCDs also suffer from a number of drawbacks. Notable among these drawbacks, which also include limited readout rates and dynamic range limitations, is the difficulty in integrating CCDs with CMOS-based microprocessors.

To overcome the limitations of CCD-based imaging circuits, more recently developed imaging circuits use active pixel sensor (APS) cells to convert a pixel of light energy into an electrical signal. With APS cells, a conventional photodiode is typically combined with a number of active transistors that, in addition to forming an electrical signal, perform attendant functions such as amplification, readout control, and reset control.

A more or less canonical implementation of an APS cell is illustrated in FIG. 1. The APS cell may be seen there to include a photodiode 10, a Row Select Transistor (RST) 11, and a charge, or current, sensing amplifier 12. RST 11 has a gate electrode 111 coupled to a RST input signal, a (drain/source) electrode 112 coupled to a supply voltage $V_{DD}$, and a (source/drain) electrode 113 coupled to cathode 101 of photodiode 10. Anode 102 of the photodiode is grounded. The cathode of photodiode 12 is coupled to input 121 of amplifier 12. The output of the pixel cell appears at output 122 of amplifier 12. The operation of an APS cell, such as illustrated in FIG. 1, is well understood by artisans of ordinary skill and, hence, for the sake of brevity, will not be narrated here.

APS cells are often fabricated using CMOS processing technology, which enables the integration of an amplifier at each pixel site and in this manner eliminates the bus capacitance and bus resistance problems associated with predecessor technologies. Whereas at one time the transistors used for manufacturing CMOS APS cells occupied a substantial portion of the pixel, transistor sizes are now small enough to allow light to penetrate a substantial portion of the pixels. The advent of submicron photolithography has played a significant role in stimulating the deployment of APS imagers. However, because the readout circuitry of the APS continues to consume a disproportionate area on the pixel cell, more improvements are anticipated in order to increase the sensitivity of the device and thereby render APS technology competitive in high-performance applications.

CMOS imagers sense light in largely the same way as CCDs. Both technologies convert incident light (photons) into electronic charge (electrons) by the same photo-conversion process. Color sensors can be constructed in substantially the same way with both technologies: normally by coating each individual pixel with a colorized filter. However, other operational aspects are markedly disparate. In APS systems, charge packets are not transferred, they are instead detected as early as possible by charge sensing amplifiers, which are made from CMOS transistors.

CMOS imaging technologies are based on the either of two embodiments of photo element: the photogate and the photodiode. Generally, photodiode sensors are more sensitive, especially to blue light, which can be important at the top of each column of pixels. The passive pixels contain just one transistor, which is used as a charge gate, switching the contents of the pixel to the charge amplifiers. These "passive pixel" CMOS sensors operate much like analog DRAMs. In active CMOS sensors, amplifiers are implemented in each pixel. Active pixel CMOS sensors usually contain at least three transistors per pixel. As might be expected, APS cells are characterized by lower noise but poorer packing density than passive pixel CMOS.

Because CMOS APS cells can be manufactured on conventional CMOS production lines, they offer the potential for significantly lower cost and also suggest the capability to be integrated with other functions, such as timing logic and analog-to-digital conversion (ADC). The promised benefits of the technology include lower power, random readout, and the realization of on-chip ADC and timing functions. The CMOS process allows the integration of an amplifier at each site. More importantly, APS cells, in theory, are able to utilize the high level of CMOS integration that can enable the fabrication of an imaging system or camera on a chip, rather than a mere imager.

Nevertheless, deployment of APS technology has been hindered by the inherently higher noise of the APS sensors (due to the readout structure), the lower quantum efficiency (due to the lower fill factor), and the compromises in semiconductor manufacturing that must be made to incorporate multiple features on a single semiconductor die.

In addition, one of the salutary features of APS imaging arrays, convenience of addressability, is burdened by an operational side effect. Specifically, a conventional APS system consists essentially of a two-dimensional array of the pixel cells, arranged in rows and columns. Rows in the array are addressed sequentially. But the row-wise addressing scheme may introduce row-wise coherent noise in output images. In other architectures, column-wise coherent noise is prevalent. The coherency of noise exacerbates its perceptibility to a human eye and therefore renders coherent noise especially objectionable.

Accordingly, what is desired is an APS system that mitigates the effects of row-wise, or column-wise, coherent noise that is associated with the addressing of an APS array. Because pixel architecture considerations impel a preference to reserve the greater proportion of pixel area to the photo-detector (photodiode or photogate), favored approaches should be simple and not consume a disproportionate degree of pixel real estate. In addition, the approach should not be susceptible to the generally deleterious effect of mismatch among the active devices that are required to form the APS array.

SUMMARY OF THE INVENTION

The above and other objects, advantages and capabilities are achieved, in one aspect of the invention, in an Active-Pixel Sensor (APS) imaging system. In one embodiment, pixels are arranged in a two-dimensional array of rows and columns and in which each pixel includes a photodiode coupled to a pixel output. Specifically, the APS system includes a circuit for generating a differential signal that results from the combination of a reference signal and an imaging pixel output. The circuit comprises a plurality of imaging pixels and a plurality of reference signals and reference column amplifiers, with each column amplifier having an input coupled to a respective output of an imaging pixel. An imaging multiplexer has a plurality of inputs, with each input coupled to a respective output of an imaging column amplifier. The column output signal appears at the output of the imaging multiplexer. The circuit also includes a plurality of reference pixels and a plurality of reference column amplifiers, with each reference column amplifier having an input coupled to a respective output of a reference pixel or reference signal. A reference signal multiplexer has a plurality of inputs coupled to respective outputs of a reference column amplifiers. The reference signal appears at the output of the reference signal multiplexer and represents a selection of the outputs of the reference column amplifiers.

In another aspect, a reference pixel circuit in an APS system comprises a plurality of reference pixel cells, each comprising a respective photodiode. Each of a plurality of reference column amplifiers has a respective input coupled to a photodiode and has a respective output. Each of the inputs of a reference multiplexer is coupled to an output of a reference column amplifier. A reference multiplexer address driver is coupled to the reference multiplexer for causing a reference signal to appear at the multiplexer output so that the reference signal is a pseudorandom selection of the output of the column amplifiers.

In a further aspect, an APS system comprises a plurality of imaging pixel cells and a reference pixel circuit. The reference pixel circuit comprises a plurality of reference pixel cells, each comprising a respective photodiode; a plurality of reference column amplifiers, each having a respective input coupled to a photodiode and having a respective output; a reference multiplexer having a plurality of inputs with each of the inputs is coupled to an output of a reference column amplifier; and a reference multiplexer driver coupled to the reference multiplexer for causing a reference signal to appear at the reference multiplexer output so that the reference signal is a pseudorandom selection of the output of the column amplifiers.

The invention also comprehends a reference pixel generator that comprises a plurality of reference pixel cells, each of the reference pixel cells comprising a photodiode; a plurality of reference column amplifiers, each of the reference column amplifiers having an input coupled to a respective photodiode and having an output; and reference generation means coupled to the outputs of the reference column amplifiers for generating a reference signal that comprises a substantially random selection from the output so the reference column amplifiers. In an alternative approach, a reference signal may be substituted for a reference pixel.

In addition, the inventive concept may be exploited as a method of mitigating the effects of row-wise and column-wise coherent noise in an active-pixel sensor (APS) systems. The method comprises (i) generating a plurality of reference pixel cell output signals or generating a reference signal, (ii) coupling each of the plurality of reference pixel cell output signals to an input of one of a plurality of reference column amplifiers or coupling a reference signal to each of a plurality of reference column amplifiers, (iii) coupling each of the respective outputs of the reference column amplifiers to an input of a multiplexer, (iv) forming a reference signal that is a substantially random selection of the outputs of the reference column amplifiers, (v) and forming a differential output comprising the combination of the reference signal and column outputs of imaging pixels.

From a general perspective, the invention is manifest in an APS imaging system including an array of pixels, where each of the pixels includes, inter alia, a photodiode coupled to the respective pixel output. Salient constituent elements of the APS imaging system reside in a mechanism for generating a column output signal and, more particularly, in a mechanism for generating a reference signal that constitutes a substantially random sample of the outputs of the reference pixels, or samples of a reference signal. Generation of the reference throughout the image signal in this manner distributes noise incoherently, thereby rendering the noise less objectionably perceptible in the image.

BRIEF DESCRIPTION OF THE DRAWINGS

The present invention may be better understood, and its numerous objects, features, and advantages made apparent to those skilled in the art by referencing the accompanying Drawings, in which.

The use of the same reference symbols in different Figures indicates identical or similar items unless otherwise noted.

DETAILED DESCRIPTION

For a thorough understanding of the subject invention, including the best mode contemplated by the inventor for practicing the invention, reference may be had to the following Detailed Description, including the appended claims, in connection with the above-described Drawings.

Figure 2:
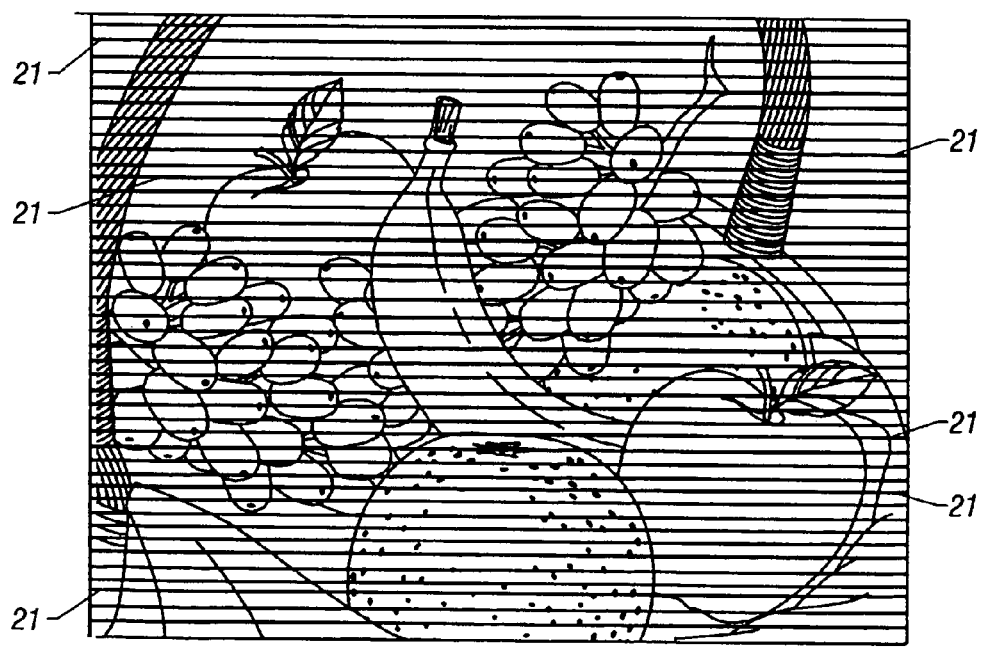
FIG. 2 is a rendition of a static image in which the effects of row-wise coherent noise are readily perceptible.

As intimated above, the invention represents a technique that includes an apparatus (circuit design) and method for reducing the effects of row-wise or column-wise coherent noise in APS imaging systems. In this regard, FIG. 2 provides a sample static image in which coherent row-wire noise is present, and perceptible in the reproduced image. Specifically, FIG. 2 reveals a number of horizontal, substantially equidistant lines 21 that traverse the width of the reproduced image. FIG. 2 demonstrates the degree to which such row-wise coherent noise may be perceptible to the human eye, and therefore, undesirable. In a manner that is described in detail below, the invention is principally based on the distribution of otherwise coherent noise throughout an image. As a result, noise coherency is vitiated and the noise, although persisting, is rendered less perceptible to the view. Operation is largely based on, and therefore applicable to, existing APS system architectures, such as, for example, the architecture employed in the APS system of FIG. 3.

Figure 1:
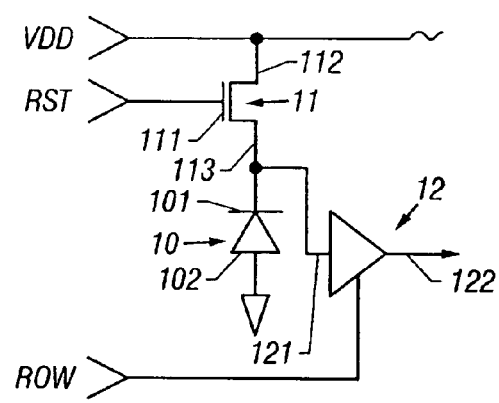
FIG. 1 is a circuit diagram of a more or less canonical form of an APS cell.
Figure 3A:
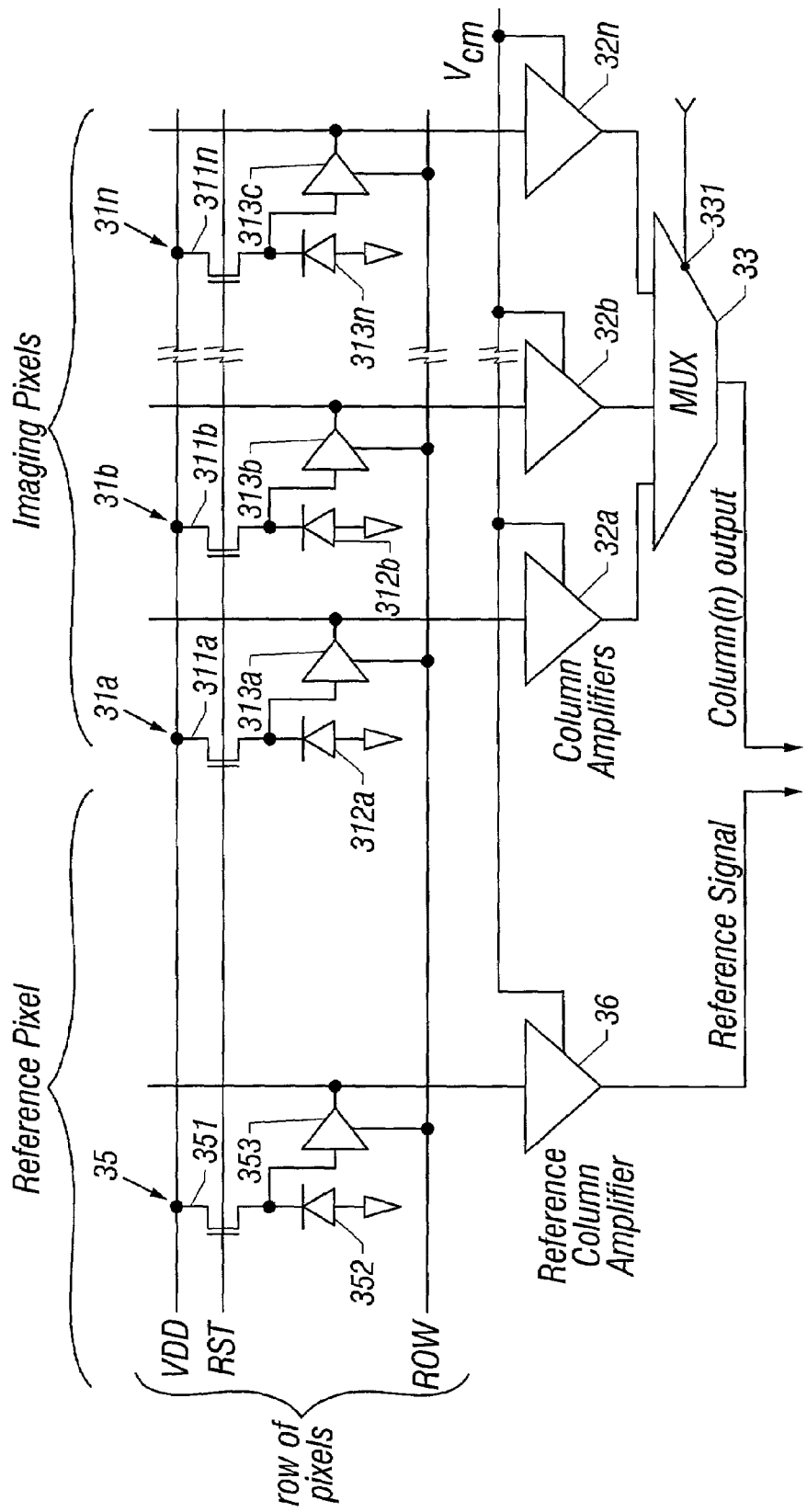
FIGS. 3A and 3B are high-level diagrams of a pixel arrays in which reference pixels are deployed as a constituent to a differential mitigates column signal that mitigates some types of noise and related phenomena.

FIG. 3A depicts an APS system that forms a differential signal that is derived from a column output signal and a reference signal. (The column output signal may alternatively be referred to as an imaging pixel signal.) FIG. 3A is a representation of one row of a pixel array that is constituted from a large number of rows and columns. Each row of the array includes a number of imaging pixels $31a$, $31b, \ldots, 31n$ that correspond to the number of columns in the array. The imaging pixels are characterized by a uniform circuit arrangement. That is, each imaging pixel includes an RST 311, a photodiode 312, and a current sensing amplifier 313, in substantially identical fashion as has been described above and illustrated in FIG. 1. It should be noted that although each of the pixel cells in the array exhibits a circuit design that is identical to every other pixel cell, there may exist slight differences in certain operating characteristics (device mismatch) that unavoidably result from variation in device fabrication processes. The output of each imaging pixel, that is, signal at the output of respective current sensing amplifier $313a$, $313b$, ... $313n$, is coupled to a respective associated column amplifier $32a$, $32b$, ... $32n$. The outputs of the column amplifiers are individually coupled to respective signal inputs of a multiplexer 33. In a manner well understood to those familiar with the art, as an image is scanned, a column output is selected by the operation of multiplexer 33. The multiplexer operates in response sequential address signals applied to the address input 331 of the multiplexer 33. Accordingly, at any point in time, the column output signal corresponds to the output of an addressed imaging pixel. That is, the (instantaneous) imaging pixel signal is the output of the selected (by multiplexer 33) column amplifier.

As suggested above, existing APS systems generally develop a differential signal in which one constituent component is the column output signal. The other component, which for the purposes of this description may be referred to as the reference signal, is typically derived from a reference pixel 35, as seen FIG. 3A. Reference pixels may be collocated in the same row of the array as do imaging pixels $31a$, $31b, \ldots 31n$, or may reside elsewhere. If resident on the same row, reference pixel 35 may be addressed in a row-addressable manner, as are the imaging pixels. For purposes of this description, reference pixel 35 may be understood to embody the same circuit design as do imaging pixels $31a$, $31b, \ldots 31n$. That is to say, reference pixel 35 includes an RST 351, a photodiode 352 and a current-sensing amplifier 353, interconnected analogously to the interconnection of the corresponding elements of the imaging pixels. The output of amplifier 353 is coupled to the input of a reference column amplifier 36. At any point in time, the output of the reference column amplifier constitutes the reference signal and forms the other component of the differential signal that propagates downstream to the remaining analog signal processing path. The reference signal, when differentially combined with the column output signal (imaging pixel signal), serves to subtract common-mode thermal noise resulting from the power supply or other sources.

Figure 3B:
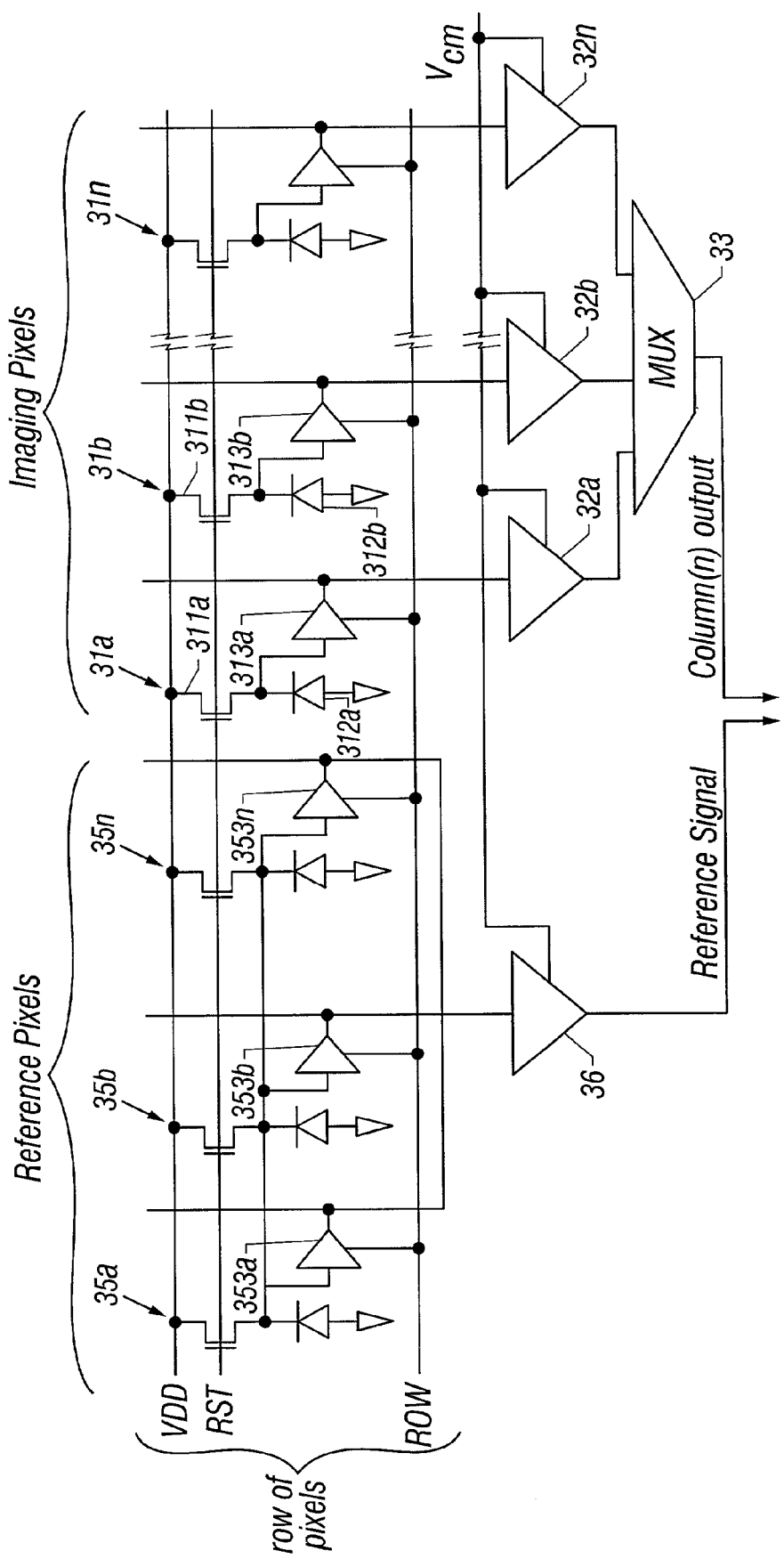

A somewhat more sophisticated approach to the fundamental scheme described immediately above (and depicted in FIG. 3A) is depicted in FIG. 3B. The arrangement of FIG. 3B reveals a number of reference pixels, $35a, 35b, \ldots, 35n$. Each of the reference pixels is interconnected to each of the other reference pixels at the cathodes of their respective photodiodes. The outputs of the current-sensing amplifiers $353a, 353b, \ldots, 353n$ are coupled to the input of column reference amplifier 36. The reference pixel arrangement of FIG. 3B represents an improved version of FIG. 3A because interconnection of the photodiodes effectively "averages", over a number of similar photodiodes, the dark current associated with each photodiode. Consequently, the difference between the average dark current integrated by the reference pixels and the average dark current of the imaging pixels in the same row is reduced.

Figure 4:
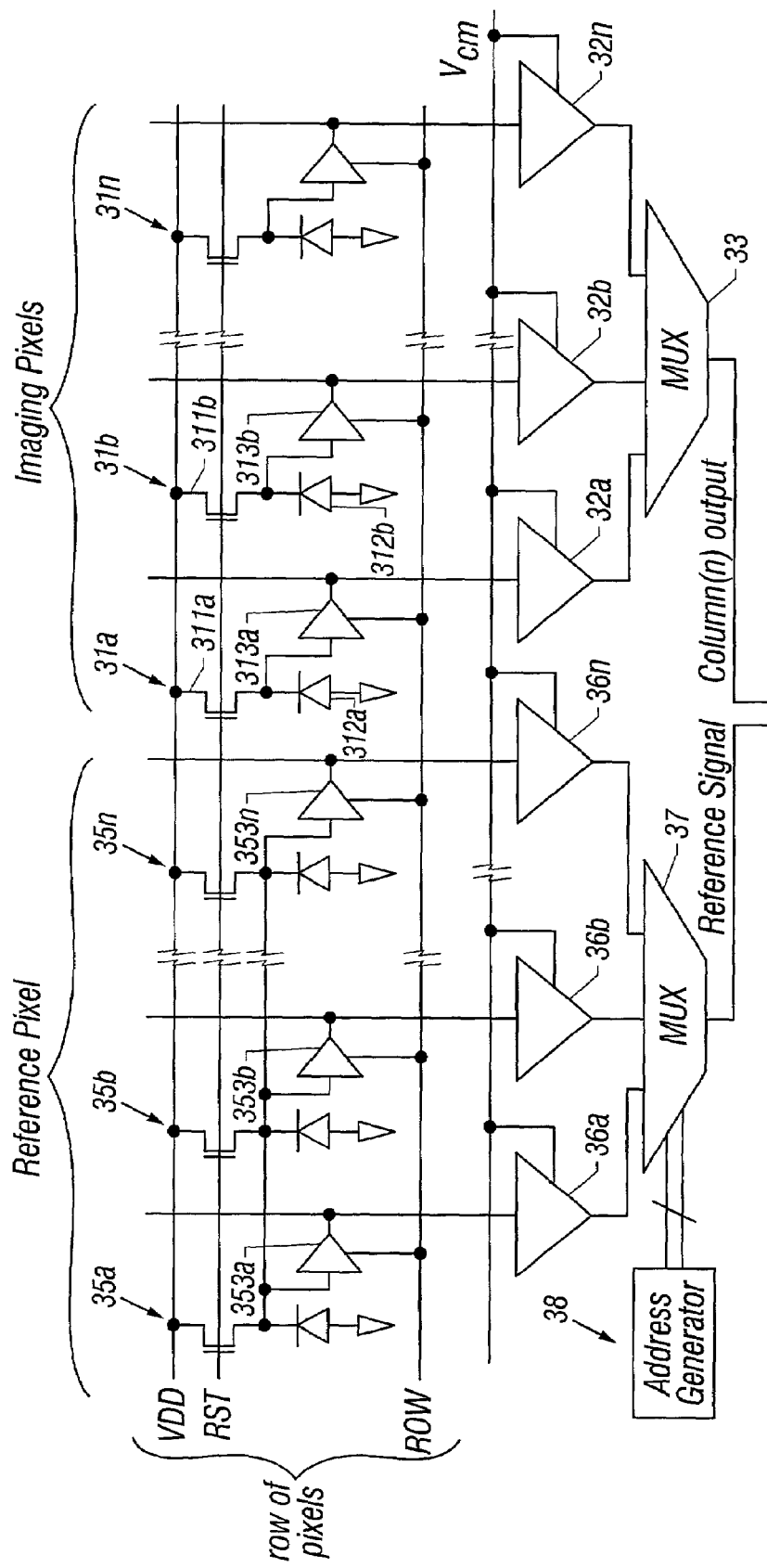
FIG. 4 is a high-level diagram of an embodiment of the invention in which the outputs of a number of reference pixels are sequentially selected to mitigate the effects of row-wise coherent noise.

However, the approaches of FIGS. 3A and 3B suffer the same undesired phenomena. That is, sampling noise introduces an offset for the entire row compared to other rows. The offset appears as coherent row-wire noise that is easily perceptible because of the manner in which it appears in the image. The subject invention, depicted in one embodiment of FIG. 4, substantially circumvents the deleterious effects associated with conventional approaches, described above, to APS sensor system signal processing.

In a manner substantially identical to what has been hereto described, each row the subject APS system includes a plurality of imaging pixels. The output of each of the imaging pixels, at the output of the respective current sensing amplifier $313a$, $313b$, ..., $313n$, is coupled to an associated column amplifier $32a$, $32b$, ... $32n$. The respective outputs of the column amplifiers are applied to associated inputs of an analog imaging multiplexer 33, so that the output of multiplexer 33 constitutes the APS system column output at a given point in time.

However, as suggested above, performance improvement in the way of a reduction in coherent row-wise and column-wise noise may be realized in a reference pixel arrangement that produces a particularly advantageous reference signal. As may be seen in FIG. 4, circuitry for synthesizing the reference signal includes a collection of reference pixels that in one embodiment are enabled on a row-by-row basis. In the embodiment depicted in FIG. 4, the reference pixels are interconnected at the cathodes of the respective photodiodes. That is, the cathode of reference pixel $RP_{r,1}$ is connected to the cathode of reference pixel $RP_{r,2}$, and from there to the cathodes of each of the remaining reference pixels $RP_{R,N}$. (Although three reference pixels are expressly shown in FIG. 4, it is to be understood that the invention is not constrained to a specific number of reference pixels.) In an alternative embodiment (not shown in the drawings), the photodiode cathodes need not be electrically connected.

The output of each of the reference pixels, at the output of the respective associated charge sensing amplifier $353a$, $353b$, ..., $353n$, is coupled to the input of a reference column amplifier. That is, the output of $RPR_1$, is coupled to the input of reference column amplifier $36a$, the output of reference pixel $RP_{R,2}$ is coupled to the input of reference column amplifier $36b$ and the output of reference pixel $RP_{R,N}$ is coupled to the input of reference column amplifier $36n$.

An individual reference column amplifier is provided for, and correlates to, each reference pixel. The outputs of the column amplifiers are coupled to respective inputs of an analog reference multiplexer 37. In a manner to be presently described, an address generator 38 is coupled to the analog reference multiplexer, and in response to the sequence of addresses applied by address generator, the analog reference multiplexer sequentially selects one of the signals at its inputs to propagate to the reference multiplexer output. In this manner the reference signal, that is, the signal at the multiplexer output, results from the sequential selection, under the control of address generator 38, of the outputs of the reference pixels. Address generator 38 may assume numerous forms and may be realized in hardware, software, firmware, or a combination of the aforementioned, but a salient aspect of the invention inheres in the concept that address generator 38 generates a sequence of addresses so that the reference signal constitutes a pseudo-random selection of signals at the inputs to reference multiplexer 37.

These input signals correspond, of course, to the respective outputs of the reference pixels.

The invention contemplates all approaches, including hardware, software, firmware or other implementations, according to which address generator 38 operates to deliver a pseudo-random sequence of addresses at the address input of multiplexer 37. The variety of specific instantiations of such approaches is limited only by the expertise of those skilled in the art. The following approaches to the pseudo-random address generation, and, therefore, reference pixel selection are provided for pedagogical purposes and are not to be taken as exhaustive or definitive.

Address generator 38 may be implemented in the form of a pseudo-random bit-stream generator. As is well known, such a generator my be constructed by those skilled in the art using conventional, commercially-available, digital logic components. Pseudo-random generators typically require a seed value, and, in one variation, the seed value may be, or may be derived from, the least significant bits (LSBs) of the address of the pixel most recently accessed.

In this regard, the address of the most recently accessed pixel may itself operate as a "randomizer" for the reference signal generator. That is the LSBs of that address would be applied to the multiplexer address input. As an embellishment, the LSBs may be permutated, or subjected to logical transformations through the interposition of combinational logic blocks, a look-up table or a ROM. It is suggested that the technique would adequately "randomize" the reference signal when applied to busy images, but may be less than optimal when applied to dim images, or images without much content, due to reduced randomization.

As an alternative approach, however, the reference signal may be synthesized simply by sequencing through the outputs of the column reference amplifiers. In this case, the addressing component degenerates into a simple counter, for example. Although randomness in reference pixel selection is sacrificed, this effect may be circumvented by including a greater number of reference pixels. That is, the inherent periodicity in reference pixel selection is rendered less apparent as the number of reference pixels is increased. In addition, because some of the sampling noise related to selection of reference column amplifiers is not characterized by row-to-row correlation, the technique may prove more effective then anticipated. However, to the extent that mismatch exists among the reference column amplifiers, a degree of fixed-pattern noise may result.

In order to substantiate the effectiveness of the enhanced APS system described above, software simulation may be conducted. Such simulation, or modeling, is also instructive in that it will likely yield empirical information that informs both quantitative and qualitative assessments of the desirability of a number of design decisions that are encountered in the implementation of the invention. In general, the simulation may proceed by injecting a predetermined level of sampling noise that is row-wise correlated.

Salient design decisions implicate the number of reference column amplifiers to be incorporated into the reference signal generator and the operating characteristics of address generator. Simulation suggests that more than four (4) reference column amplifiers are required to provide significant improvement. Simulation also suggests that the inclusion of sixteen (16) reference column amplifiers effectively suppresses coherent row-wise noise. With respect to multiplexer address generation, simulation results indicate that reference column selection is satisfactory when based on either (i) previously addressed pixel address modulus the number of reference pixels or (ii) pseudo-random number generation using either a software algorithm or hardware implementation.

Reference column amplifier selection based on a scheme using the LSBs of the previously addressed pixel or on simple sequential selection are both adequate and represent a material improvement over known-techniques. However, these two approaches can be expected to require substantial number of reference columns in order to randomly distribute the noise, and their effectiveness may depend on the characteristics of the image encountered.

Accordingly, while particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

In particular, it should be understood from the above that although a specific circuit arrangement for both the imaging pixels and the reference pixels has been described, the invention is not confined to that arrangement, and numerous variations in pixel cell design may be used within ambit of the invention. The gravamen of the invention is a plurality of reference pixel cells outputs or signals that are sequentially selected with a degree of randomness, so as to distribute what would otherwise be coherent noise throughout an image. An in this regard, it should be clear that the selection of reference pixels need not be precisely mathematically random. All that is required is a degree of randomness in reference pixel selection that, when considered together with the number of reference pixel outputs, "randomizes" the distribution of noise in a manner that causes the noise to be less readily perceptible to the human eye.

What is claimed is:

1. In an Active-Pixel Sensor (APS) imaging system comprising an array of pixels arranged in rows and columns, with each pixel including a photodiode coupled to a pixel output, a circuit for generating a differential signal for coupling to an analog signal path, the differential signal consisting essentially of a combination of a reference signal and a column output, the circuit comprising:
   a plurality of imaging pixels;
   a plurality of imaging column amplifiers, each imaging column amplifier having an input coupled to a respective output of an imaging pixel;
   an imaging multiplexer having a plurality of inputs and an output, each imaging multiplexer input being coupled to a respective output of an imaging column amplifier, wherein the column output appears at the imaging multiplexer output;
   a plurality of reference pixels;
   a plurality of reference column amplifiers, each reference column amplifier having an input coupled to a respective output of a reference pixel; and
   a reference signal multiplexer having a plurality of inputs and an output, each reference signal multiplexer input being coupled to a respective output of a reference column amplifier, wherein the reference signal appears at the reference signal multiplexer output and represents a selection of the outputs of the reference column amplifiers.

2. A circuit as defined in claim 1, further comprising a reference signal multiplexer driver coupled to the reference signal multiplexer for causing the reference signal to appear at the reference signal multiplexer output.

3. A circuit as defined in claim 2, wherein the reference signal multiplexer operates to substantially randomly select the reference signal from the outputs of the reference column amplifiers.

4. A circuit as defined in claim 3, wherein the reference signal multiplexer driver applies a reference signal multiplexer address to an address input of the reference signal multiplexer.

5. A circuit as defined in claim 4, wherein the reference signal multiplexer address is a substantially random number.

6. A circuit as defined in claim 5, wherein the reference signal multiplexer driver comprises a pseudorandom number generator.

7. A circuit as defined in claim 6, wherein a seed value for the pseudorandom number generator consists essentially of the last significant bits of the address of the previously addressed pixel.

8. A circuit as defined in claim 5, wherein the reference signal multiplexer address is a permutation of the least significant bits of the address of the previously addressed pixel.

9. A circuit as defined in claim 5, wherein the reference signal multiplexer address is a logical transformation of the least significant bits of the address of the previously addressed pixel.

10. In an active pixel sensor (APS) system, a reference pixel circuit comprising:
 plurality of reference pixel cells, each comprising a respective photodiode;
 a plurality of reference column amplifiers, each having a respective input coupled to a photodiode and having a respective output;
 a reference multiplexer having a plurality of inputs and an output, each of which inputs being coupled to an output of a reference column amplifier; and
 a reference multiplexer driver coupled to the reference multiplexer for causing a reference signal to appear at the reference multiplexer output so that the reference signal is a substantially random selection of the outputs of the reference column amplifiers, wherein the reference multiplexer driver applies an address to the reference multiplexer, the address being a substantially random number.

11. A reference pixel circuit as defined in claim 10, wherein the photodiodes are interconnected.

12. A reference pixel circuit as defined in claim 10, wherein the reference multiplexer driver comprises a pseudorandom number generator.

13. A reference pixel circuit as defined in claim 12, wherein a seed value forte pseudorandom number generator consists essentially of the least significant bits of the address of the previously addressed pixel.

14. A reference pixel circuit as defined in claim 10, wherein the address applied to the reference multiplexer is a permutation of the least significant bits of the address of the previously addressed pixel.

15. A reference pixel circuit as defined in claim 10, wherein the address applied to the reference multiplexer is a logical transformation of the least significant bits of the address of the previously addressed pixel.

16. An active pixel sensor (APS) system comprising:
 a plurality of imaging pixel cells; and
 a reference pixel circuit, the reference pixel circuit comprising:
  a plurality of reference pixel cells, each comprising a respective photodiode;
  a plurality of reference column amplifiers, each having a respective input coupled to a photodiode and having a respective output;
  a reference multiplexer having a plurality of inputs and an output, each of which inputs being coupled to an output of a reference column amplifier; and
  a reference multiplexer driver coupled to the reference multiplexer for causing a reference signal to appear at the reference multiplexer output so that the reference signal is a substantially random selection of the outputs of the reference column amplifiers, wherein the reference multiplexer driver has address lines to the reference multiplexer, the address lines carrying substantially random addresses.

17. An APS system as defined in claim 16, wherein the reference pixel circuit comprises at least four reference pixel cells.

18. An APS system as defined in claim 16, wherein the photodiodes are interconnected.

19. An APS system as defined in claim 18, wherein the reference pixel circuit comprises at least four pixel cells.

20. A reference signal generator for an APS sensor system, the reference signal generator comprising:
 a plurality of reference pixel cells, each of the reference pixel cells comprising a photodiode;
 a plurality of reference column amplifiers, each of the reference column amplifiers having an input coupled to a respective photodiode and having an output; and
 reference generation means coupled to the outputs of the reference column amplifiers for generating a reference signal that comprises a substantially random selection from the outputs of the reference column amplifiers.

21. A reference signal generator as defined in claim 20, wherein the reference generation means comprises:
 a multiplexer having a plurality of inputs, each of which is coupled to the output of a reference column amplifier; and
 an address driver coupled to the multiplexer for causing the multiplexer to select an output from the outputs of the reference column amplifiers, the selected output corresponding to the reference signal.

22. A reference signal generator as defined in claim 21, wherein the address driver provides an address to the multiplexer, the address being a substantially random number.

23. A reference signal generator as defined in claim 22, wherein the address consists essentially of the least significant bits of the address of the previously addressed pixel.

24. A reference signal generator as defined in claim 22, wherein the address is a permutation of the least significant bits of the address of the previously addressed pixel.

25. A reference signal generator as defined in claim 22, wherein the address is a logical transformation of the least significant bits of the address of the previously addressed pixel.

26. A method of mitigating the effects of coherent noise in an active-pixel sensor (APS) system, the method comprising:
 generating a plurality of reference pixel cell output signals;
 coupling each of the plurality of reference pixel cell output signals to an input of one of a plurality of reference column amplifiers;
 coupling each of the respective outputs of the reference column amplifiers to an input of a reference multiplexer;
 forming a reference signal that is a substantially random selection of the outputs of the reference column amplifiers; and forming a differential output comprising the combination of the reference signal and column outputs of imaging pixels.

27. A method of mitigating the effects of coherent noise in an APS system as defined in claim 26, wherein the reference signal is formed by sequentially applying addresses to the reference multiplexer, which addresses consist essentially of substantially random numbers.

28. A method of mitigating the effects of coherent noise in an APS system as defined in claim 27, wherein the addresses consist essentially of the least significant bits of the address of the most recently addressed pixel.

29. A method of mitigating the effects of coherent noise in an APS system as defined in claim 27, wherein the addresses are generated by a pseudorandom number generator tat accepts as a seed value the least significant bits of the address of the most recently addressed pixel.

30. A method of mitigating the effects of coherent noise in an APS system as defined in claim 27, wherein the addresses consist essentially of a permutation of the least significant bits of the address of the most recently addressed pixel.

31. A method of mitigating the effects of coherent noise in an APS system as defined in claim 27, wherein the addresses consist essentially of a logical transformation of the least significant bits of the address of the most recently addressed pixel.

32. An Active-Pixel Sensor (APS) imaging system including an array of pixels, each of the pixels in turn including a photodiode coupled to the respective pixel output, to APS imaging system comprising:
   means for generating a column output signal; and
   means for generating a reference signal that constitutes a substantially random sampling of the outputs of a plurality of reference pixels, wherein the means for generating a reference signal comprises:
      a reference signal multiplexer having inputs coupled to respective outputs of the plurality of reference pixels, the reference signal multiplexer providing the reference signal at an output; and
      a multiplexer driver coupled to the reference signal multiplexer for determining the reference signal that appears at the output of the reference signal multiplexer in response to an address that is applied to the reference signal multiplexer by the multiplexer driver.

33. An APS imaging system as defined in claim 32, wherein the multiplexer driver operates to couple a substantially random binary number to the reference signal multiplexer.

34. An APS imaging system as defined in claim 32, wherein the multiplexer driver operates to formulate the address from the least significant bits of the address of the pixel that had been most recently addressed.

35. An APS imaging system as defined in claim 32, wherein the multiplexer driver operates to formulate the address by permutating the least significant bits of the address of pixel that had been most recently addressed.

36. An APS imaging system as defined in claim 32, wherein the multiplexer driver operates to formulate the address by logically transforming the least significant bits of the address of the pixel that had been most recently addressed.

37. A method of designing an Active-Pixel Sensor (APS) imaging system that comprises an array of pixels arranged in rows and columns, with each pixel including a photodiode coupled to a pixel output, and that comprises a circuit for generating a differential signal, the differential signal consisting essentially of a combination of a reference signal and a column output, wherein the circuit comprises:
   (i) a plurality of imaging pixels;
   (ii) a plurality of imaging column amplifiers, each having an Input coupled to a respective output of an imaging pixel;
   (iii) an imaging multiplexer having a plurality of inputs and an output, each input coupled to a respective output of an imaging column amplifier, wherein the column output appears at the output of the imaging multiplexer;
   (iv) a plurality of reference pixels;
   (v) a plurality of reference column amplifiers, each reference column amplifier having an input coupled to a respective output of a reference pixel;
   (vi) a reference signal multiplexer having a plurality of inputs and an output, each reference signal multiplexer input being coupled to a respective output of a reference column amplifier, wherein the reference signal appears at the output of the reference signal multiplexer and represents a selection of the outputs of the reference column amplifiers; and
   (vii) an address driver coupled to the reference signal multiplexer for causing the reference signal multiplexer to select an output from the outputs of the reference column
amplifiers so that the selected output corresponds to the reference signal, the method comprising:
   causing an image to be generated;
   injecting sampling noise into the image;
   establishing a first predetermined number of reference column amplifiers; and
   applying addresses to the reference signal multiplexer in accordance wit a first predetermined addressing algorithm.

38. A method as defined in claim 37, further comprising:
   applying addresses to the reference signal multiplexer in accordance with a second predetermined addressing algorithm.

39. A method as defined in claim 37, further comprising: establishing a second predetermined number of reference column amplifiers.

40. A method as defined in claim 39, further comprising:
   applying addresses to the reference signal multiplexer in accordance with a second predetermined addressing algorithm.

41. In an Active-Pixel Sensor (APS) imaging system comprising an array of pixels arranged in rows and columns, a circuit for generating a differential signal for coupling to an analog signal path, the differential signal comprising a combination of a reference signal and an imaging pixel signal, the circuit comprising:
   a plurality of imaging pixels;
   an imaging multiplexer having a plurality of inputs and one output, each imaging multiplexer input being coupled to a respective output of an imaging pixel, the imaging multiplexer output providing the imaging pixel signal;
   a plurality of reference pixels;
   a reference signal multiplexer having a plurality of inputs and one output, each reference signal multiplexer input coupled to a respective output of a reference pixel, the reference signal multiplexer output providing the reference signal; and
   a substantially random address generator having address lines coupled to the reference signal multiplexer.

* * * * *